(12) United States Patent
Gupta et al.

(10) Patent No.: US 10,452,423 B2
(45) Date of Patent: Oct. 22, 2019

(54) METHOD AND APPARATUS FOR LIGHT-WEIGHT VIRTUALIZATION CONTEXTS

(71) Applicant: Intel Corporation, Santa Clara, CA (US)

(72) Inventors: Deepak K. Gupta, Hillsboro, OR (US); Ravi L. Sahita, Beaverton, OR (US); Barry E. Huntley, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/953,292

(22) Filed: Apr. 13, 2018

(65) Prior Publication Data

US 2018/0307519 A1    Oct. 25, 2018

Related U.S. Application Data

(63) Continuation of application No. 14/867,761, filed on Sep. 28, 2015, now Pat. No. 9,946,566.

(51) Int. Cl.
    *G06F 9/455*     (2018.01)

(52) U.S. Cl.
    CPC .. *G06F 9/45558* (2013.01); *G06F 2009/4557* (2013.01); *G06F 2009/45575* (2013.01)

(58) Field of Classification Search
    CPC .................................................. G06F 9/45558
    USPC ............................................................ 718/1
    See application file for complete search history.

(56) References Cited

U.S. PATENT DOCUMENTS

| | | |
|---|---|---|
| 6,944,699 B1 | 9/2005 | Bugnion et al. |
| 8,533,428 B2 | 9/2013 | Bennett et al. |
| 2005/0132363 A1* | 6/2005 | Tewari ............... G06F 9/45558 718/1 |
| 2005/0223220 A1* | 10/2005 | Campbell ........... G06F 9/45537 713/164 |
| 2007/0006228 A1 | 1/2007 | Grobman et al. |
| 2009/0100250 A1 | 4/2009 | Chen et al. |
| 2010/0199277 A1 | 8/2010 | Galal et al. |
| 2013/0074070 A1 | 3/2013 | Warton et al. |

OTHER PUBLICATIONS

Zabaljauregui, Matias, "Hardware Assisted Virtualization Intel Virtualization Technology", Jun. 2008, 54 pages, http://linux.linti.unlp.edu.ar/images/f/f1/Vtx.pdf.
International Search Report and Written Opinion for International Application No. PCT/US2016/047601, dated Nov. 25, 2016, 12 pages.

* cited by examiner

*Primary Examiner* — Timothy A Mudrick
(74) *Attorney, Agent, or Firm* — Lowenstein Sandler LLP

(57) ABSTRACT

A processor comprises a register to store a first pointer to a context data structure specifying a virtual machine context, the context data structure comprising a first field to store a second pointer to a plurality of realm switch control structures (RSCSs), and an execution unit comprising a logic circuit to execute a virtual machine (VM) according to the virtual machine context, wherein the VM comprises a guest operating system (OS) comprising a plurality of kernel components, and wherein each RSCS of the plurality of RSCSs specifies a respective component context associated with a respective kernel component of the plurality of kernel components, and execute a first kernel component of the plurality of kernel components using a first component context specified by a first RSCS of the plurality of RSCSs.

20 Claims, 13 Drawing Sheets

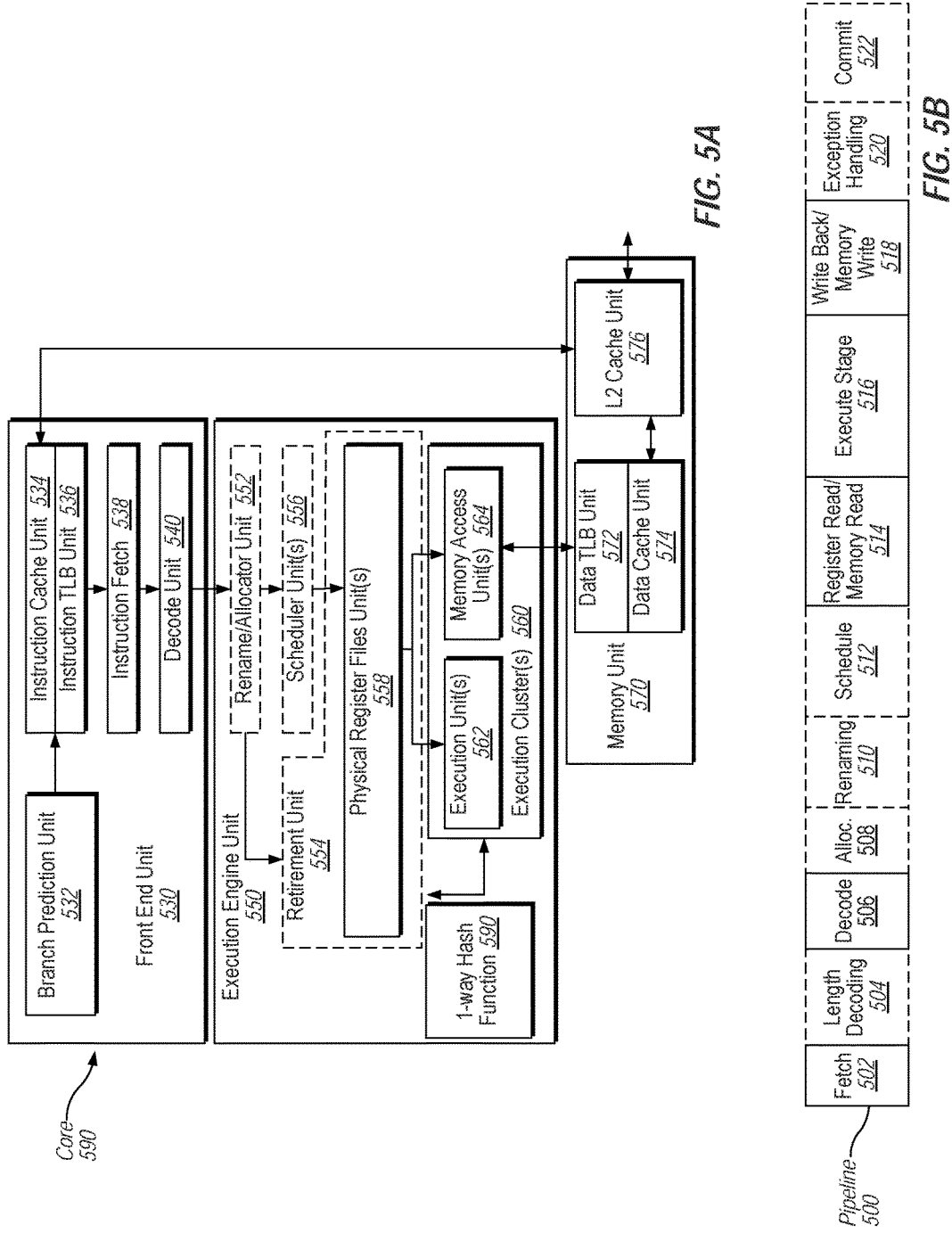

METHOD AND APPARATUS FOR LIGHT-WEIGHT VIRTUALIZATION CONTEXTS

CROSS REFERENCE TO RELATED APPLICATION

This application is a continuation of U.S. patent application Ser. No. 14/867,761, filed on Sep. 28, 2015, which is hereby incorporated by reference herein.

TECHNICAL FIELD

The present disclosure relates to virtualization and, more specifically, to enabling light-weight virtual machine context switches.

BACKGROUND

An operating system is associated with an attack surface—a sum of different points where an unauthorized user ("attacker") can try to enter data to or extract data from the operating system. CPU virtualization has been used to reduce the attack surface. But, using CPU virtualization to reduce the attack surface requires expensive virtual machine (VM) context switches through VM operations including VM exit, VM context switch, and VM resume. These VM operations are associated with expensive overheads. As the granularity of code becomes finer, frequent context switches to reduce the attack surface of an operating system become the bottleneck to high performance computing.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5A is a block diagram illustrating a micro-architecture for a processor including heterogeneous core in which one embodiment of the disclosure may be used.

FIG. 5B is a block diagram illustrating an in-order pipeline and a register renaming stage, out-of-order issue/execution pipeline implemented according to at least one embodiment of the disclosure.

DETAILED DESCRIPTION

The kernel of an operating system (either an operating system of a host machine or a guest operating system of a virtual machine) may include one or more operating system components to provide services such as, for example, scheduler, process management, I/O management, memory management, drivers (e.g., file system and volume drivers, mass storage drivers, and bus drivers), and code integrity management services to software applications running under the environment of the operating system. Embodiments of the present disclosure provide an operating system with a variety of component contexts specified according to realm switch control structures (RSCSs). The RSCSs enable light-weight switches between different component contexts without exiting the VM on which the operating system runs.

These RSCSs enable these operating system (OS) components to run at the same privilege level (e.g., ring 0) while still enforcing clear boundaries between different OS components. Thus, embodiments of the present disclosure enable the mutual protections among operating system components within the kernel, and provide software fault isolation. This light-weight component context switch (implemented on a logic circuit as a new processor instruction) provides system software with the flexibility to implement various protection models without significantly adding performance overheads.

Figure 1:
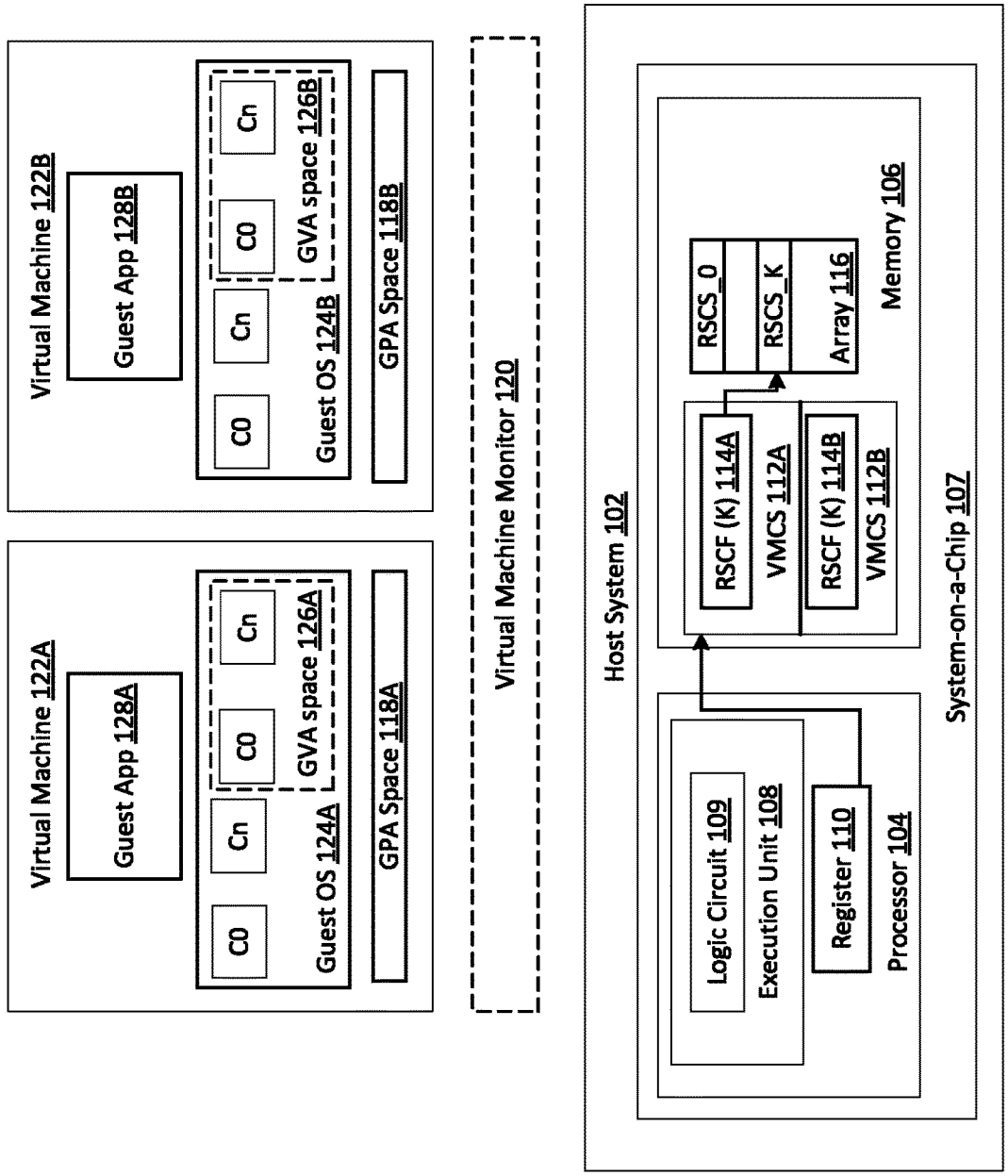
FIG. 1 illustrates a system for light-weight context switches according to an embodiment of the present disclosure.

FIG. 1 illustrates a system 100 for light-weight context switches according to an embodiment of the present disclosure. The system 100 may include a host 102 such as, for example, a server computer or any suitable computing devices that support virtualization. Host 102 may further include a processor 104 and a memory 106. In one embodiment, processor 104 and memory 106 may be implemented on a system-on-a-chip (SoC) 107. The processor 104 may be a hardware processor such as a central processing unit (CPU) that includes one or more processing cores (not shown) that may be configured to execute system software and user application software. The memory 106 may be a suitable type of storage device to store instructions of software applications and the data associated with the software applications. Memory 106 may be addressed according to memory addresses defined in a host physical address (HPA) space.

Processor 104 may further include an execution unit 108 to execute instructions and a register 110 to store data. In one embodiment, execution unit 108 of processor 104 may include a logic circuit 109 implemented to support execution of a set of virtualization instructions (virtual-machine extension (VMX)) to provide support for one or more virtualization environments ported on host 102. The VMX may provide processor-level support for virtual machines. In one embodiment, the VMX may include instructions to generate a virtual machine monitor (VMM) 120 that is a host program that allows one or more execution environments (or virtual machines (VMs)) to run on the host 102. Referring to FIG. 1, VMM 120 may create and run virtual machines (VMs) 122A, 122B. Alternatively, execution unit 10 may execute VMX instructions to directly generate VMs 122A, 122B without the need for VMM 120.

VMs 122A, 122B may behave like a regular computing device including a virtual processor (not shown) to end users. A virtual CPU (vCPU) (not shown) associated with VMs 122A, 122B may execute a respective guest operating system (guest OS) 124A, 124B. Guest applications 128A, 128B may run within the environments of guest operating systems 124A, 124B. Guest operating systems 128A, 128B (including kernels) can include a number of guest-OS components (or kernel components) to provide a number of services to guest applications 128A, 128B. In one embodiment, these guest-OS components run at the same processor privilege level (e.g., the highest ring 0 privilege level). In one embodiment, the guest-OS-provided services may include scheduler, process management, I/O management, memory management, drivers (e.g., file system and volume drivers, mass storage drivers, and bus drivers), and code integrity management services.

VMs 122A, 122B may access memory 106 through a series of memory space mappings. Each VM may construct a guest virtual address (GVA) space 126A, 126B that may be mapped to a corresponding guest physical address (GPA) space 118A, 118B for the VM 122A, 122B. A control register (e.g., CR3) associated with the processor 104 may contain the base address of the page directory that may be used to calculate a mapping between the GVA space 126A, 126B and the corresponding GPA space 118A, 118B for the VM 122A, 122B. The GPA space 118A, 118B of the VM 122A, 122B may be mapped to the host physical address (HPA) space of the host system 102. The mapping from the GPA space 118A, 118B of a VM 122A, 122B to the HPA space of the host may be translated via the extended page table (EPT) associated with the current VMCS running on the processor 104.

Figure 2:
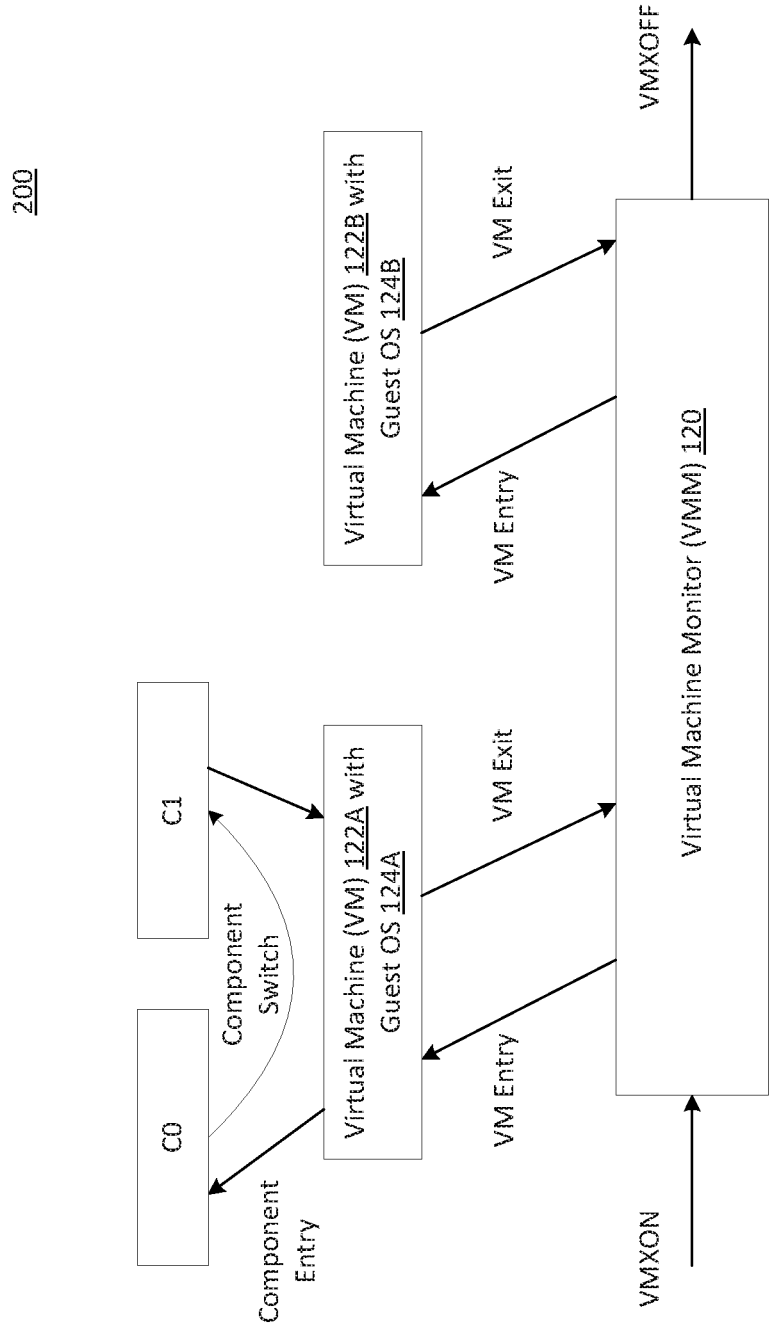
FIG. 2 illustrates a life cycle of a virtual machine monitor (VMM) and the associated virtual machines (VMs) according to an embodiment of the present disclosure.

VMs can be created and removed from host 102 by executing appropriate VMX instructions. Execution unit 108 of processor 104 via logic circuit 109 may execute VMX instructions to create life cycles of VMM software and associated VMs. FIG. 2 illustrates a life cycle of VMM 120 and the associated VMs 122A, 122B according to an embodiment of the present disclosure. As shown in FIG. 2, a host software application executing by execution unit 108 on processor 104 may enter VMX operations by executing a VMX start instruction (e.g., VMXON) to start VMM 120. Under the VMX operations, VMM 120 can then enter VMs 122A, 122B by executing VM entry instructions (e.g., VMLAUNCH or VMRESUME). End users may use created VMs to run guest applications. After the use of VMs, VMM 120 can regain control using VM exit instructions that would stop the VMs.

Thus, VMX operations are divided into root operations under which VMM runs and non-root operations under which guest software (e.g., VMs and guest OS) runs. Therefore, there are two kinds of VMX transitions: transitions into VMX non-root operation (VM entries) from root operations and transitions from VMX non-root operation to VMX root operation (VM exits).

Processor 104 of the host 102 may control non-root operation and VMX transitions using virtual machine control structures (VMCSs). A VMCS is a data structure (in the HPA space) containing operational states of the guest VM and the host machine. The operational states may include states of control registers, instruction pointers, and stack pointers. The operational states provide a VM context for the VM to operate. Access to the VMCSs is managed through a VMCS pointer (one per virtual processor or logic processor) stored in register 110. VMM 120 may configure a VMCS using VMX instructions (e.g., VMREAD, VMWRITE, and VMCLEAR). A VMCS is a data structure that includes data fields to specify a VM context for VMs supported by host 102. VMM 120 may have access via the HPA to a number of active VMCSs stored in memory 106 as shown in FIG. 1. At a given time, one VMCS is current and is used to specify the VM context for a currently-running VM with respect to one virtual processor.

In one embodiment, as shown in FIG. 1, memory 106 may include one or more regions (referred to as VMCS regions) to store active VMCSs 112A, 112B. For example, each VMCS region may contain data of one VMCS that can be used to specify a VM context. In response to receiving a request for VM entry, VMM 120 may determine a current VMCS based on the request and use the current VMCS to specify the VM context. In one embodiment, processor 104 may include a register 110 to store the VMCS pointer to the current VMCS (e.g., as shown in FIG. 1, VMCS 112A). Register 110 may store an address in the HPA space of memory 106 at which the current VMCS is stored.

Data stored in VMCS 112A, 112B may be organized into different groups including a guest-state area, a host state area and other fields relating to VM-execution control, VM-exit control, VM-entry control, and VM-exit information. Processor state (such as content stored in control registers, instruction pointer registers, and stack pointer registers of the processor) may be loaded from the guest-state area upon entering the VM and saved into the guest-state area upon exiting the VM, whereas the processor state may be loaded from the host-state area upon VM exits. Thus, the VM is associated with a current VMCS.

In one embodiment, the guest-state area of VMCSs 112A, 112B may further include fields to store processor state that is loaded from these fields on every VM entry of the corresponding VM and saved into these fields on every VM exit. These fields may store, but not limited to, content of control registers (e.g., CR3) that may be used to calculate a mapping from the guest virtual address (GVA) to the guest physical address (GPA) of the VM, content of instruction pointer registers (RIP), and content of stack pointer registers (RSP). These fields may optionally include a field to store a pointer to the extended page table (EPTP) that may be used to calculate a mapping from the guest physical address (GPA) space to host physical address (HPA) space of the VM. The host-state area may include similar fields to store processor state upon VM exits.

Guest operating systems (including kernels) 124A, 124B may include different guest-OS components (C0, . . . , Cn) to provide different services to guest applications 128A, 128B. Currently, VMM 120 runs all guest-OS components of a guest OS at a same ring-0 privilege level. Further, guest-OS components (C0, . . . , Cn) may have the same access right to the GPA space 118A, 118B. Thus, each guest-OS component runs under the same VM context (defined in VMCS associated with the VM) with no boundaries between two different guest-OS components. Therefore, current approaches to reducing the attack surface require frequent full VM context switches by switching entire VMCS (i.e., VM exits) which can be computationally expensive.

To reduce the need for full VM switches, embodiments of the present disclosure provide a respective context (referred to as "component context") for each guest-OS component.

These component contexts may provide boundaries between different guest-OS components and allow switch from a first guest-OS component (currently running) (e.g., C0) to a second guest-OS component (C1) without executing the costly VM exit operations. For example, as shown in FIG. 2, a VM 122A may provide a first service from a currently-running guest-OS component C0. To provide a second service provided by guest-OS component C1, execution unit 108 via logic circuit 109 may first execute guest-OS component switch instructions directed at entering guest-OS component C1 without exiting the current VM. Thus, the guest code may switch between guest-OS components using light-weight (with less latency) component context switches rather than the full VM context switches.

To provide component contexts, in one embodiment as shown in FIG. 1, each VMCS 112A, 112B may further include a realm switch control field (RSCF) 114A, 114B to store a respective pointer to one or more realm switch control structures (RSCSs) such as, for example, RSCS_1, . . . RSCS_K store in an array 116 in memory 106, whereas array 116 is addressable through the HPA space of memory 106. An RSCS may be searched from area 116 according to an index value i=1, . . . , K. In one embodiment, there is an upper bound that determines how many RSCSs may be stored in the array 116. For example, in one embodiment, the upper range may be 64 or a current component context may be chosen from at most 64 RSCSs. These RSCSs stored in array 116 may include sub-fields containing data relating to component contexts under which guest-OS components operate.

Figure 3:
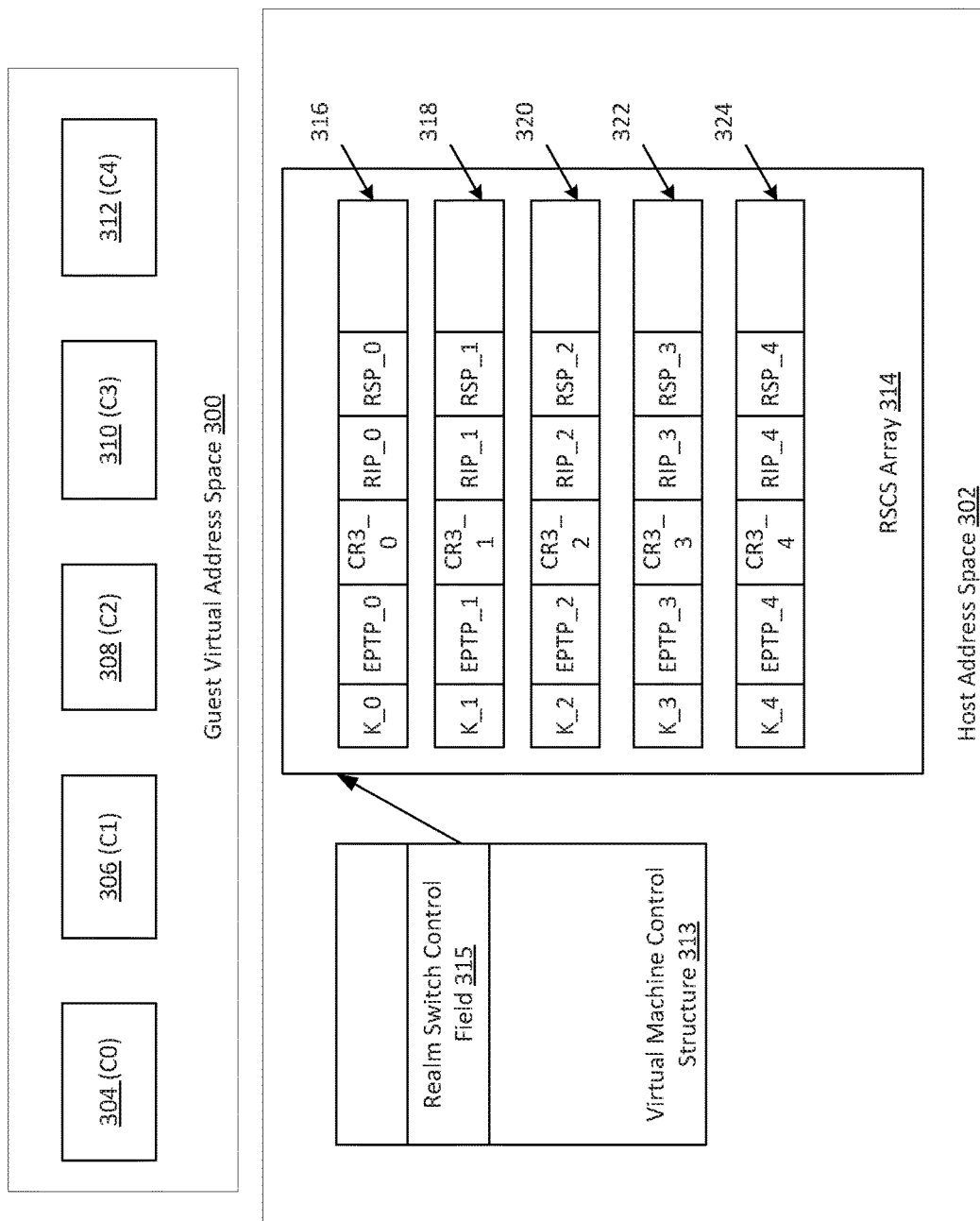
FIG. 3 illustrates a partitioned guest virtual address (GVA) space and a realm switch control structure (RSCS) array that contains one or more RSCSs according to an embodiment of the present disclosure.

In one embodiment, VMM 120 may partition GVA space 126A, 126B associated with VM 122A, 122B into regions associated with different guest-OS components and thus provide boundaries between different guest-OS components. FIG. 3 illustrates a partitioned guest virtual address (GVA) space 300 and a realm switch control structure (RSCS) array 314 that contains one or more RSCSs stored in HPA space 302 according to an embodiment of the present disclosure. As shown in FIG. 3, GVA space 300 may be partitioned into regions 304-312 that are respectively assigned to different guest-OS components C0-C4 by VMM 120. Thus, each of guest-OS components C0-C4 may operate within its assigned GVA region.

In one embodiment, HPA space 302 may contain regions to store VMCS 313 that may further contain a realm switch control field 315 pointing to an RSCS array 314. RSCS array 314 may contain RSCSs 316-324. Each RSCS may further include sub-fields to store processor state when a guest-OS component exits and load processor state from these fields when the guest-OS component starts. The processor state loaded from an RSCS may provide a component context for the component being switched to.

FIG. 3 illustrates an RSCS array 314 that contains one or more RSCSs according to an embodiment of the present disclosure. As shown in FIG. 3, RSCSs 316-324 may each correspond to one component context and include a number of sub-fields. In one embodiment, each of RSCSs 316-324 may include, but not limited to, the following sub-fields: a key field (K_n, n=0, . . . , 4) representing an identifier (e.g., an alphanumerical string of certain length) to be matched in order to switch to the $n^{th}$ guest-OS component; EPTP_n representing an EPTP associated with the $n^{th}$ guest-OS component; CR3_n representing the content of control register CR3 associated with the $n^{th}$ guest-OS component; RIP_n representing content of instruction pointer registers associated with the $n^{th}$ guest-OS component; RSP_K representing content of stack pointer registers associated with the $n^{th}$ guest-OS component. Each of the component contexts may provide the context for the corresponding guest-OS component of the guest OS to run.

In one embodiment, VMM 120 may specify a component context for a guest-OS component (e.g., any one of C0-C4) using the RSCS associated with the guest-OS component, thus creating boundaries between different guest-OS components. In this way, VMM 120 may partition the guest OS 128A, 128B into guest-OS components (e.g., C0-C4) that can be switched into without invoking VM exit instructions. Each guest-OS component, when made current by VMM 120, may be associated with data stored in a CR3 register to provide a mapping between the GVA space and the GPA space and with data stored in EPT register to provide a mapping between the GPA space and the HPA space. In this way, VMM 120 may provide guest-OS component specific mapping between GVA space and HPA through contents in the CR3 and EPTP sub-fields of RSCSs. The mappings may map GVA spaces associated with different guest-OS components of a VM to different regions in the HPA space or to the same region in the HPA space. In one embodiment, VMM 120 may associate each guest-OS component with different access permissions (or trust levels) for accessing the GPA space associated with the memory. A trust level is an aggregation of permissions associated with accessing the GPA space. For example, VMM 120 may define, in a sub-field of an EPTP_n, an access permission to the GPA space. The access permission may include "read only," "write," "read/write," "execute only," "read/execute," "read/execute/write," etc. A guest-OS component (such as C0) may be associated with a "read only" permission for a guest physical address (e.g., GPA=0x1000) specified according to EPTP_0 stored in RSCS_0, while another guest-OS component (such as C1) may be associated with a "read and write" permission for the same guest physical address (e.g., GPA=0x1000) specified according to EPTP_1 stored in to RSCS_1. Thus, guest-OS component C1 may have a higher trust level over guest physical address space (e.g., GPA=0x1000) than guest-OS component C0 although both guest-OS components C0 and C1 run at the same privilege level (ring 0).

In one embodiment, VM may execute a VMX instruction with a leaf value designated for guest-OS component switching (e.g., vmfunc(1)) to initiate a switch from a first guest-OS component running under a first component context to a second guest-OS component running under a second component context, whereas a leaf value is a value stored in a register and used to identify a particular vmfunc( ) for guest-OS component switches.

Figure 4A:
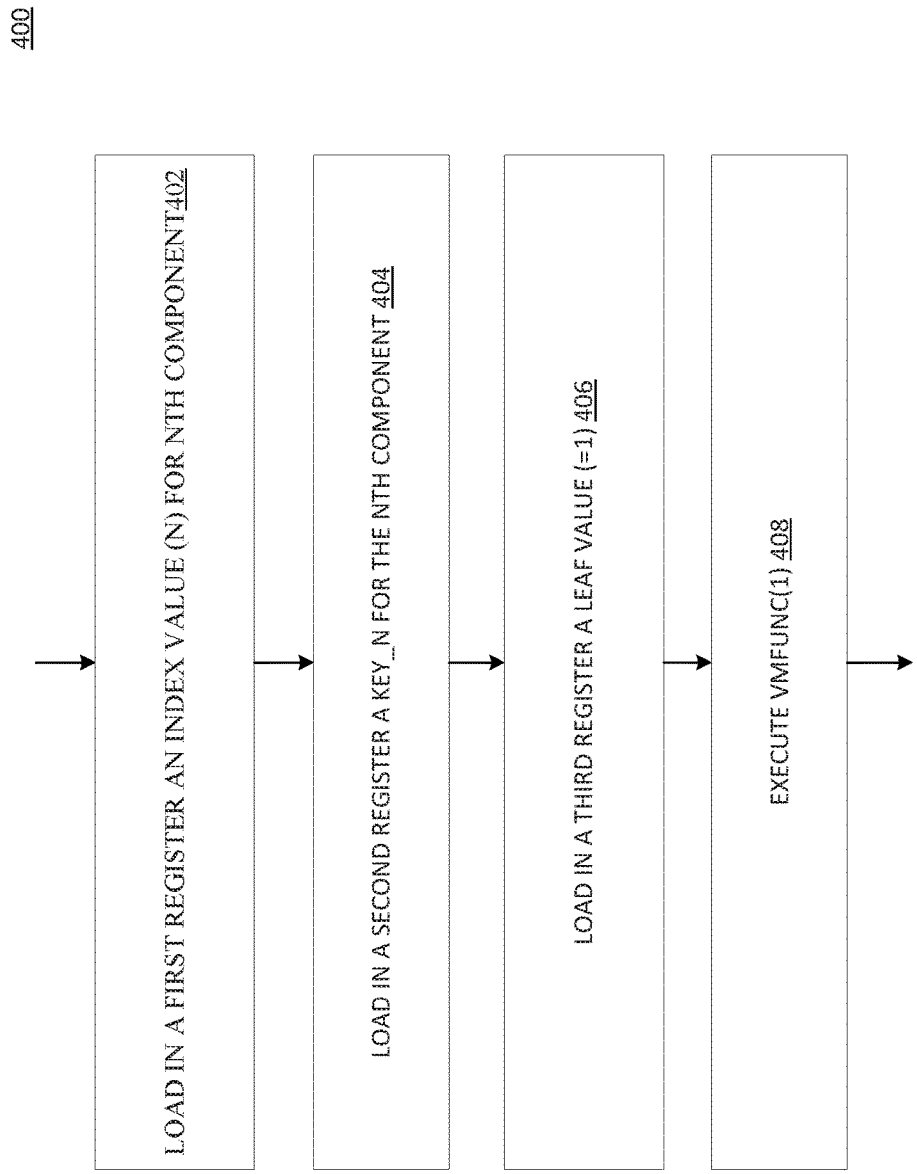
FIG. 4A is a block diagram of a method for guest software to invoke a guest operating system (guest-OS) component switch according to an embodiment of the present disclosure.

FIG. 4A is a block diagram of a method 400 for guest software to cause a guest-OS component switch according to an embodiment of the present disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logics of processor 104 including execution unit 108 and logic circuit 109 as shown in FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4A, guest software (e.g., the guest OS) may issue a command to switch from a current executing guest-OS component Cj to guest-OS component Cn to invoke the service provided by guest-OS component Cn, whereas j and n are indices for different guest-OS components. The guest software may, at 402, to load, in a first register (R1) (e.g., a general register of the CPU), the index value n to indicate the $n^{th}$ guest-OS component as the target guest-OS component.

At 404, the guest software may load, in a second register (R2), the key (k_n) associated with the $n^{th}$ guest-OS component. The key (k_n) may be used to verify whether a retrieved RSCS structure is indeed associated with the $n^{th}$ guest-OS component.

At 406, the guest software may load, in a third register (a leaf register R3), a unique leaf value (e.g., leaf value=1) associated with the VMX instruction that may cause the guest OS to switch to the $n^{th}$ guest-OS component as defined in the first register (R1), whereas the unique leaf value distinguishes this VMX instruction from pre-existing VMX instructions (e.g., instructions to initiate VMM/VM).

At 408, the guest software may call the VM function (vmfunc(1)) that is identified by a leaf value (e.g., leaf_value=1), whereas the VM function is to initiate the switch to the $n^{th}$ guest-OS component.

Figure 4B:
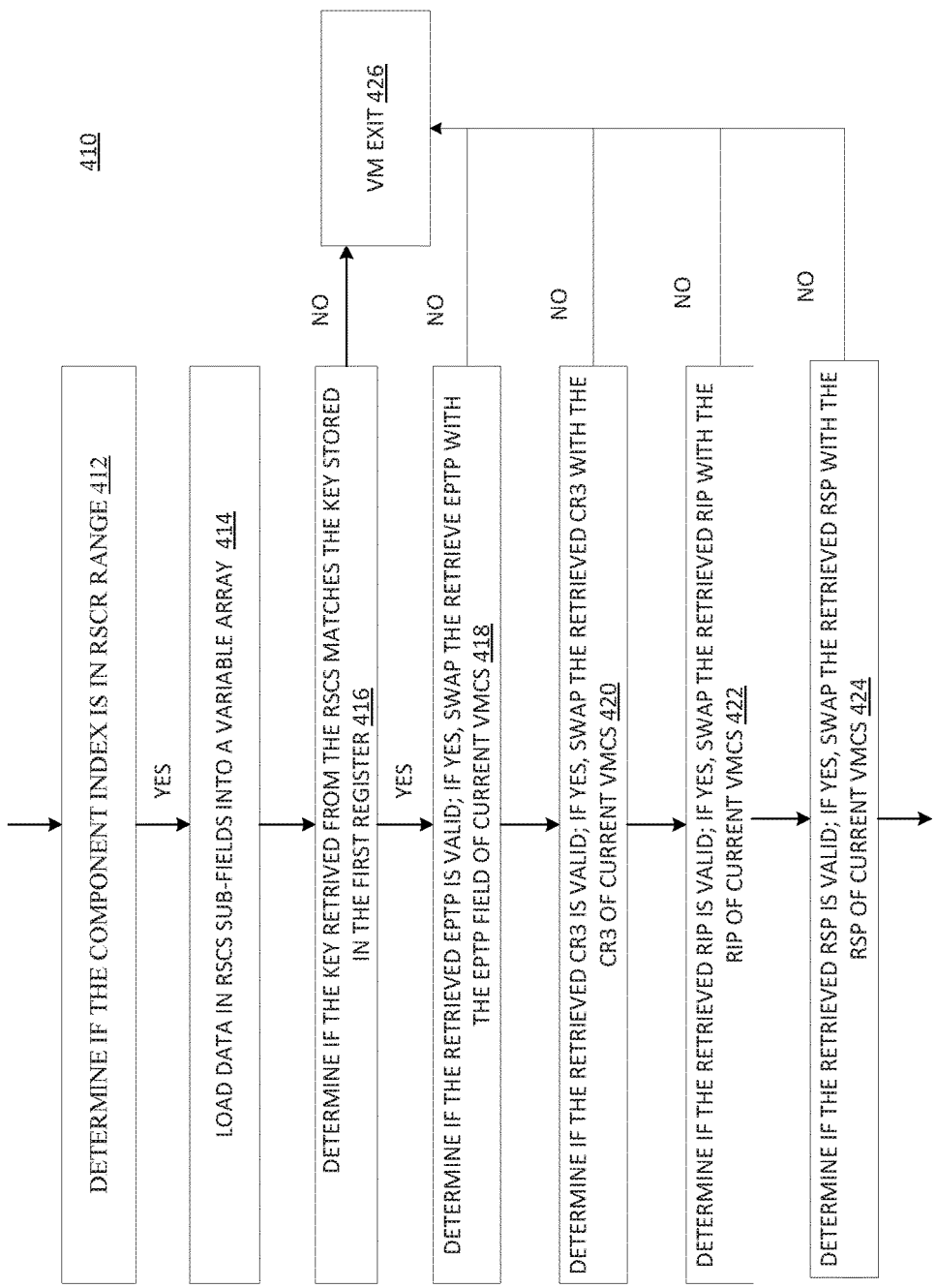
FIG. 4B is a block diagram of a method for a processor to perform a guest-OS component switch according to an embodiment of the present disclosure.

The execution unit of the host processor may receive the VM function call to initiate the switch to the $n^{th}$ guest-OS component of the guest operating system. FIG. 4B is a block diagram of a method 410 for the processor to perform a guest-OS component switch according to an embodiment of the present disclosure. Method 410 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 410 may be performed, in part, by processing logics of processor 104 including execution unit 108 and logic circuit 109 as shown in FIG. 1.

For simplicity of explanation, the method 410 is depicted and described as a series of acts. However, acts in accordance with this disclosure can occur in various orders and/or concurrently and with other acts not presented and described herein. Furthermore, not all illustrated acts may be performed to implement the method 410 in accordance with the disclosed subject matter. In addition, those skilled in the art will understand and appreciate that the method 410 could alternatively be represented as a series of interrelated states via a state diagram or events.

Referring to FIG. 4B, an execution unit of a host may already run a VM according to a current context specified by a current VMCS. The current VMCS may include fields for EPTP, CR3, RIP, and RSP. These fields may include data designed to run a first guest-OS component. At 412, the execution unit of a host processor may execute guest software (e.g., guest OS) including a VM function to initiate the guest-OS component switch (e.g., vmfunc(1)). In response to detecting the command to initiate the guest-OS component switch, the execution unit may retrieve the index value stored in the first general register (R1) as discussed in conjunction with FIG. 4A and determine if the retrieved index value is within the range of RSCSs stored in the memory. For example, if the index value is 15 and the stored RSCS index ranges from 0 to 63, the index value is within range. If the index value is out of the RSCS index range (e.g., index value >63), the execution unit may execute VM exit operations to exit the VM.

If the index value is within the RSCS range, at 414, the execution unit may search for an RSCS associated with the index value in the RSCS area and retrieve data stored in sub-fields of the RSCS associated with the index value. In one embodiment, each sub-field may contain eight bytes of data. The retrieved data may be loaded into general registers that are accessible by the execution unit. For example, five registers (tent_key, tent_EPTP, tent_CR3, tent_RIP, tent_RSP) may be used to store the data retrieved from key, EPTP, CR3, RIP, and RSP fields of the retrieved RSCS.

At 416, the execution unit may determine if the key value (stored in tent_key) retrieved from the key sub-field of the retrieved RSCS matches the key stored in the second register (R2) as discussed in conjunction with FIG. 4A by the guest software calling for the guest-OS component switch. If the two keys do not match, at 426, the execution unit may execute VM exit operations to exit the VM.

If the two keys match each other, at 418, the execution unit may determine if the EPTP value (stored in tent_EPTP) retrieved from the EPTP sub-field of the retrieved RSCS is valid by checking whether the EPTP is within an EPTP range associate with the VM. If the execution unit determines that the retrieved EPTP is not valid, at 426, the execution unit may execute VM exit operations to exit the VM. If the execution unit determines that the EPTP is valid, the execution unit may swap the retrieved EPTP stored in tent_EPTP with the EPTP field of the current VMCS being used by the VM. The new EPTP value is used for address mapping between GPA space associated with the virtual processor of the VM and the HPA space associated with the physical memory of the Host. The original EPTP value of the current VMCS swapped into the tent_EPTP register can be swapped back if the switch of guest-OS component later fails for any reason.

In response to successfully updating the EPTP value of the current VMCS, at 420, the execution unit may determine if the retrieved CR3 value (stored in tent_CR3) is a valid CR3 value by checking if the CR3 is within the CR3 range associated with the VM. If the execution unit determines that the retrieved CR3 value is not valid, at 426, the execution unit may first restore the EPTP field of the current VMCS by swapping back the EPTP value stored in the tent_EPTP register into the EPTP field of the current VMCS, and then execute VM exit operations to exit the VM. If the execution unit determines that the CR3 value is valid, the execution unit may swap the CR3 value stored in the tent_CR3 register with the CR3 field of the current VMCS.

In response to successfully updating the EPTP and CR3 values of the current VMCS, at 422, the execution unit may determine if the retrieved RIP value (stored in tent_RIP) is a valid RIP value by checking if the RIP value is within the RIP range associated with the VM. If the execution unit determines that the retrieved RIP value is not valid, at 422, the execution unit may first restore the EPTP and CR3 fields of the current VMCS by swapping back the EPTP and CR3 values stored in the tent_EPTP and tent_CR3 registers, and then execute VM exit operations to exit the VM. If the execution unit determines that the RIP value is valid, the execution unit may swap the RIP value stored in the tent_RIP register with the RIP field of the current VMCS.

In response to successfully updating the EPTP, CR3, and RIP fields of the current VMCS, at 424, the execution unit may determine if the retrieved RSP value (stored in the tent_RSP register) is a valid RSP value by checking if the RSP value is within the RSP range associated with the VM. If the execution unit determines that the retrieved RSP value is not valid, at 426, the execution unit may first restore the EPTP, CR3, and RIP fields of the current VMCS by swapping back the EPTP, CR3, and RIP values stored in the tent_EPTP, tent_CR3, and tent_RIP registers and then execute VM exit operations to exit the VM. If the execution unit determines that the RSP value is valid, the execution unit may swap the RSP value stored in the tent_RSP register with the RSP field of the current VMCS. After the swap of EPTP, CR3, RIP, and RSP data, the execution unit may execute the target guest-OS component according to the updated VMCS.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 104 described with respect to FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefetching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processing device 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
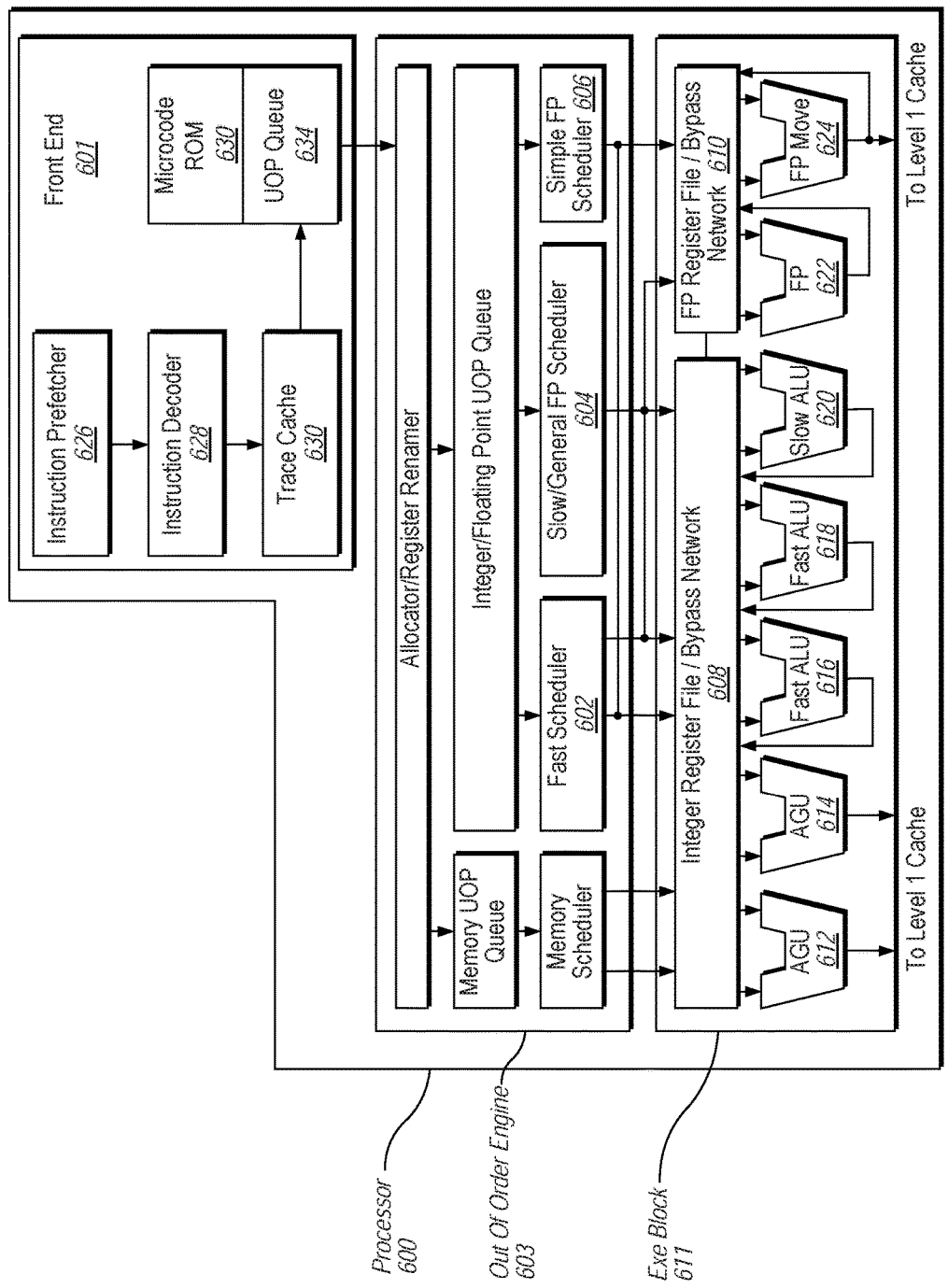
FIG. 6 illustrates a block diagram of the micro-architecture for a processor that includes logic in accordance with one embodiment of the disclosure.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files

608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
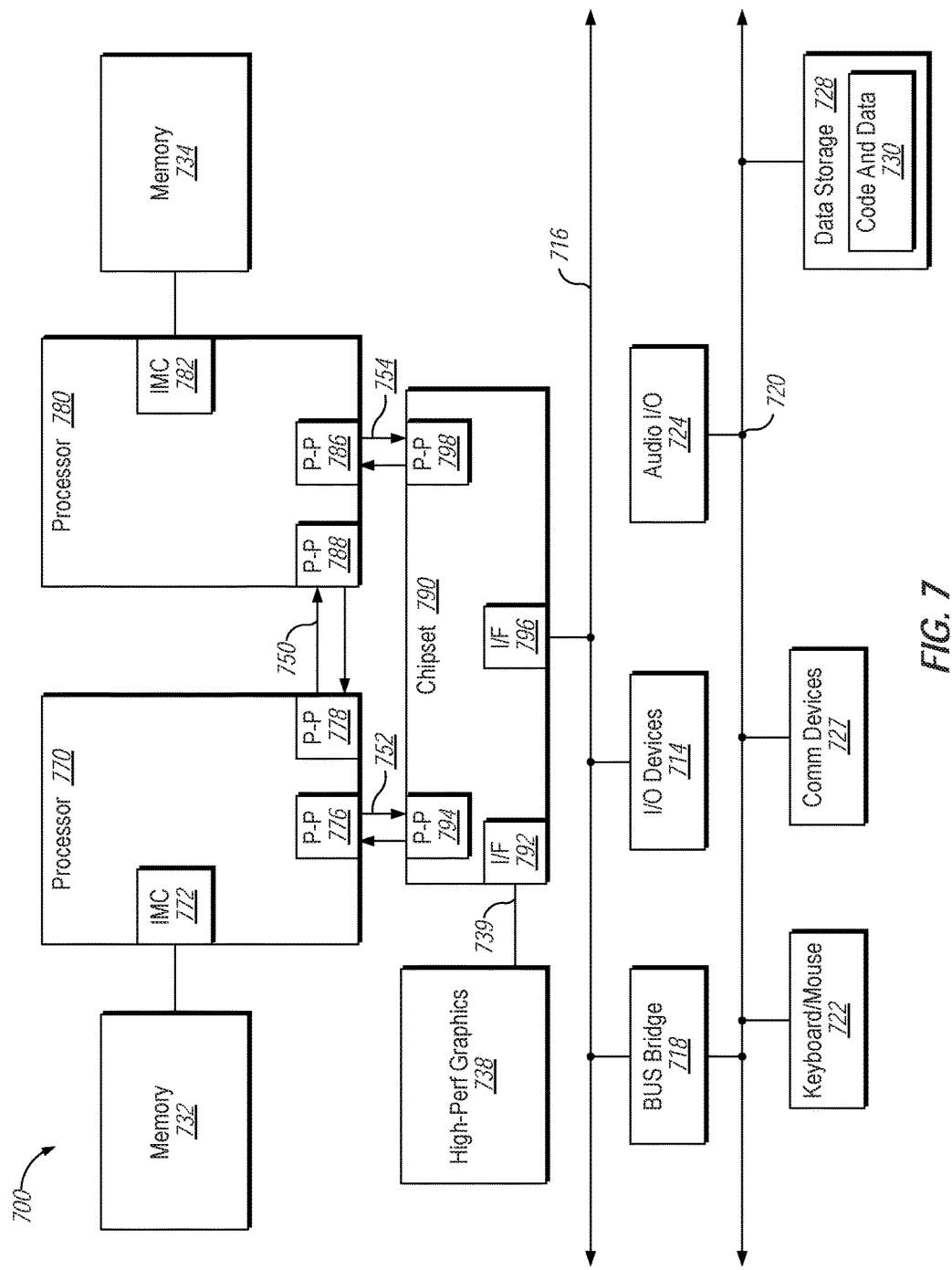
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
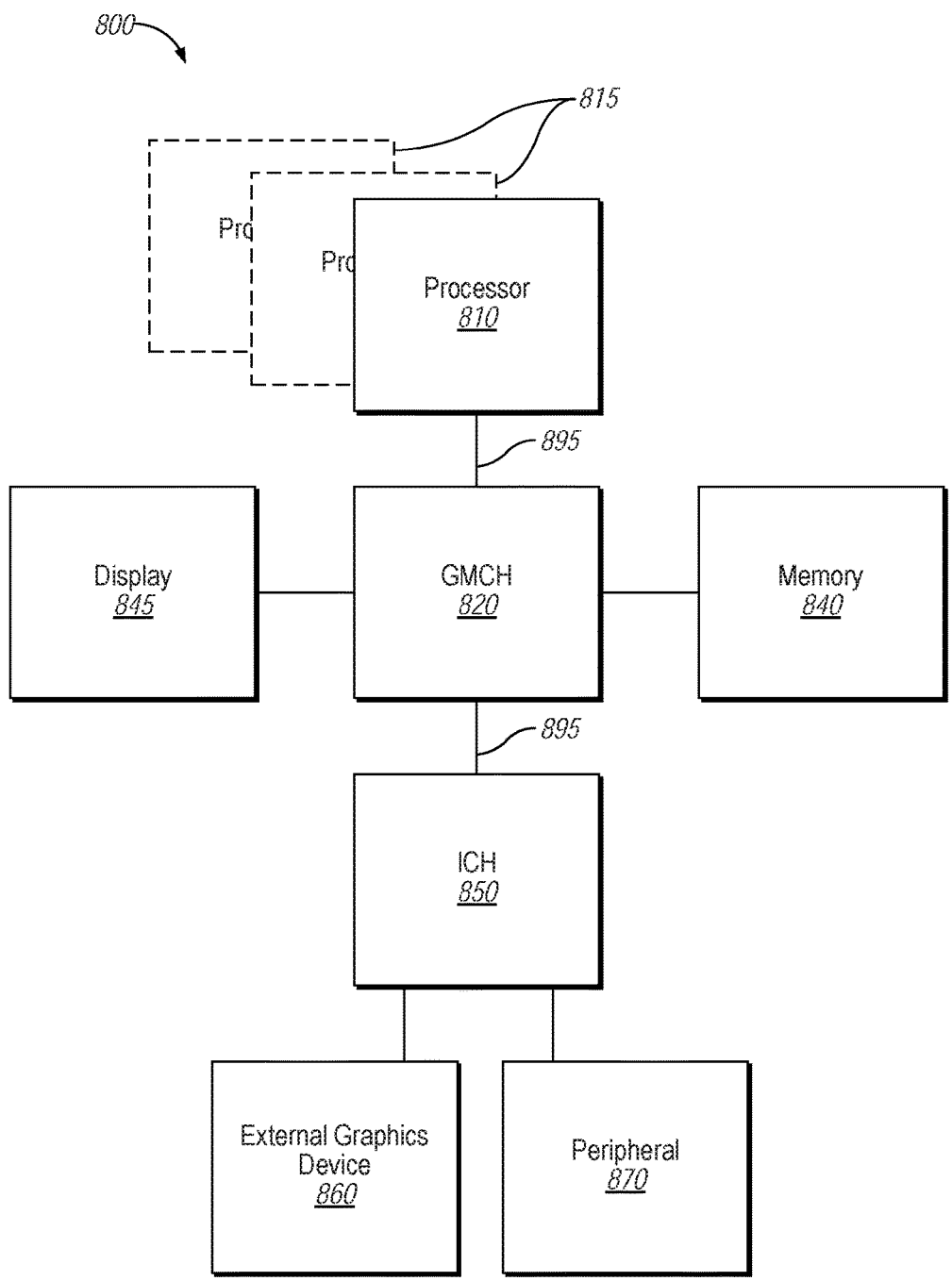
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
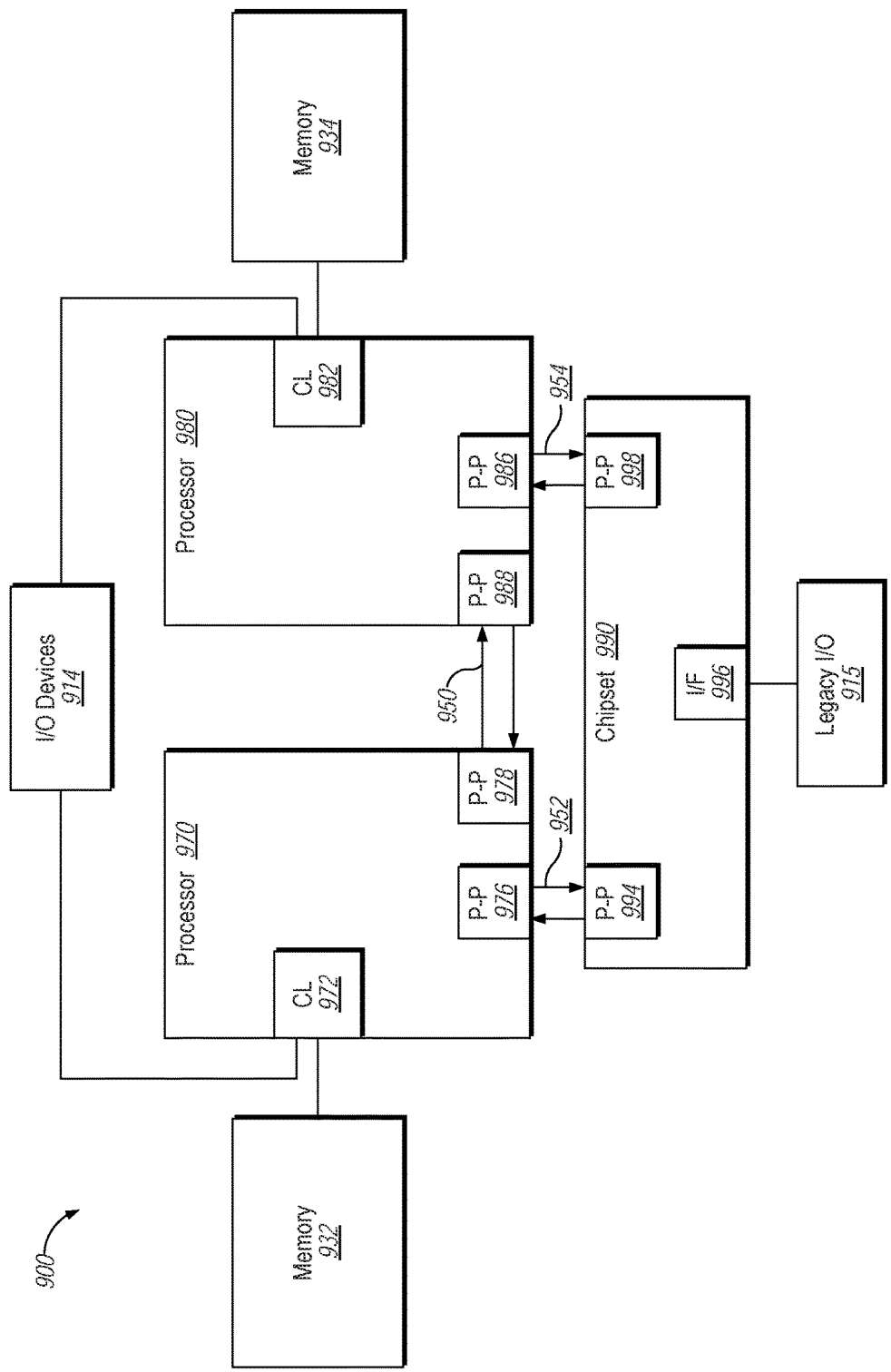
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
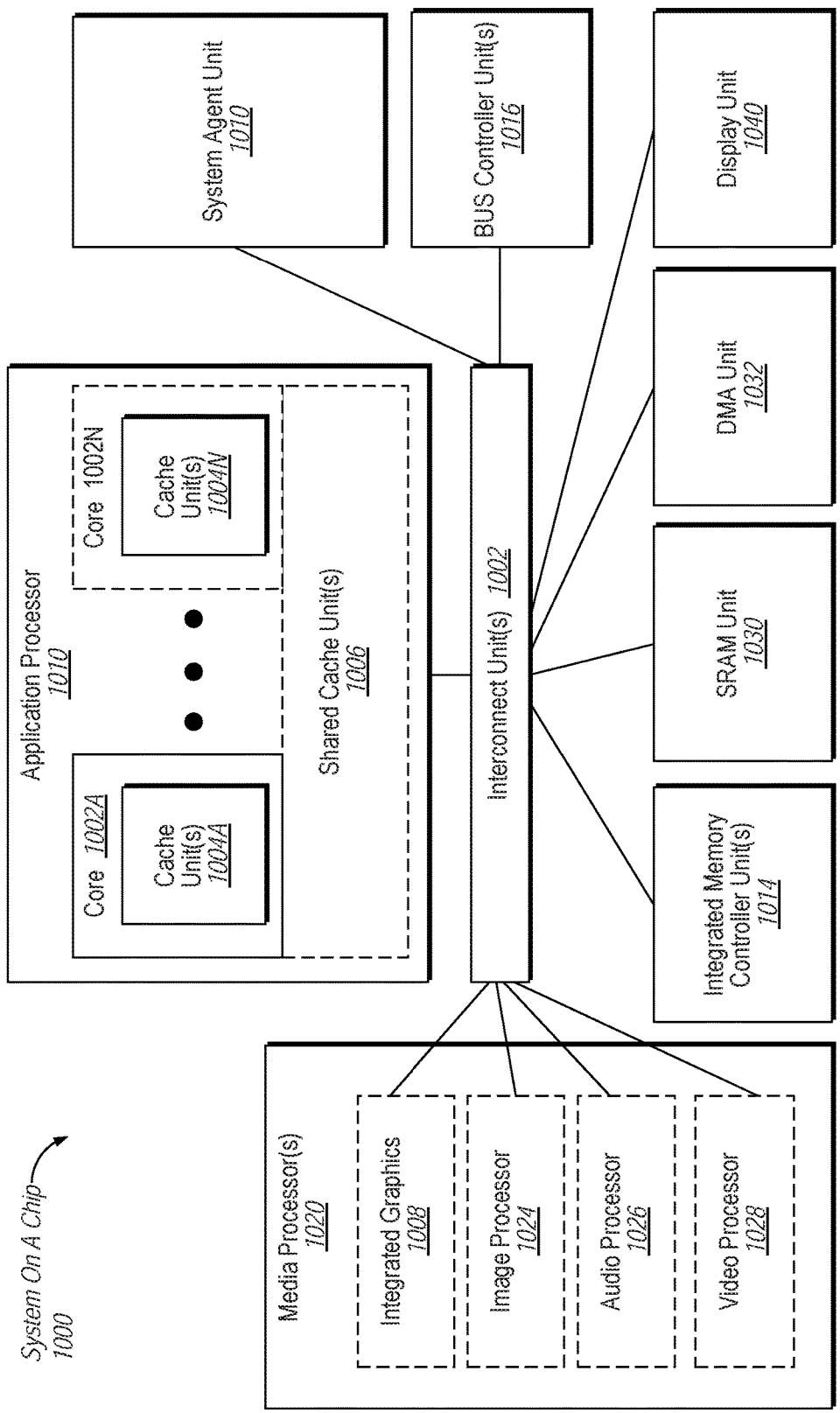
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like.

The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
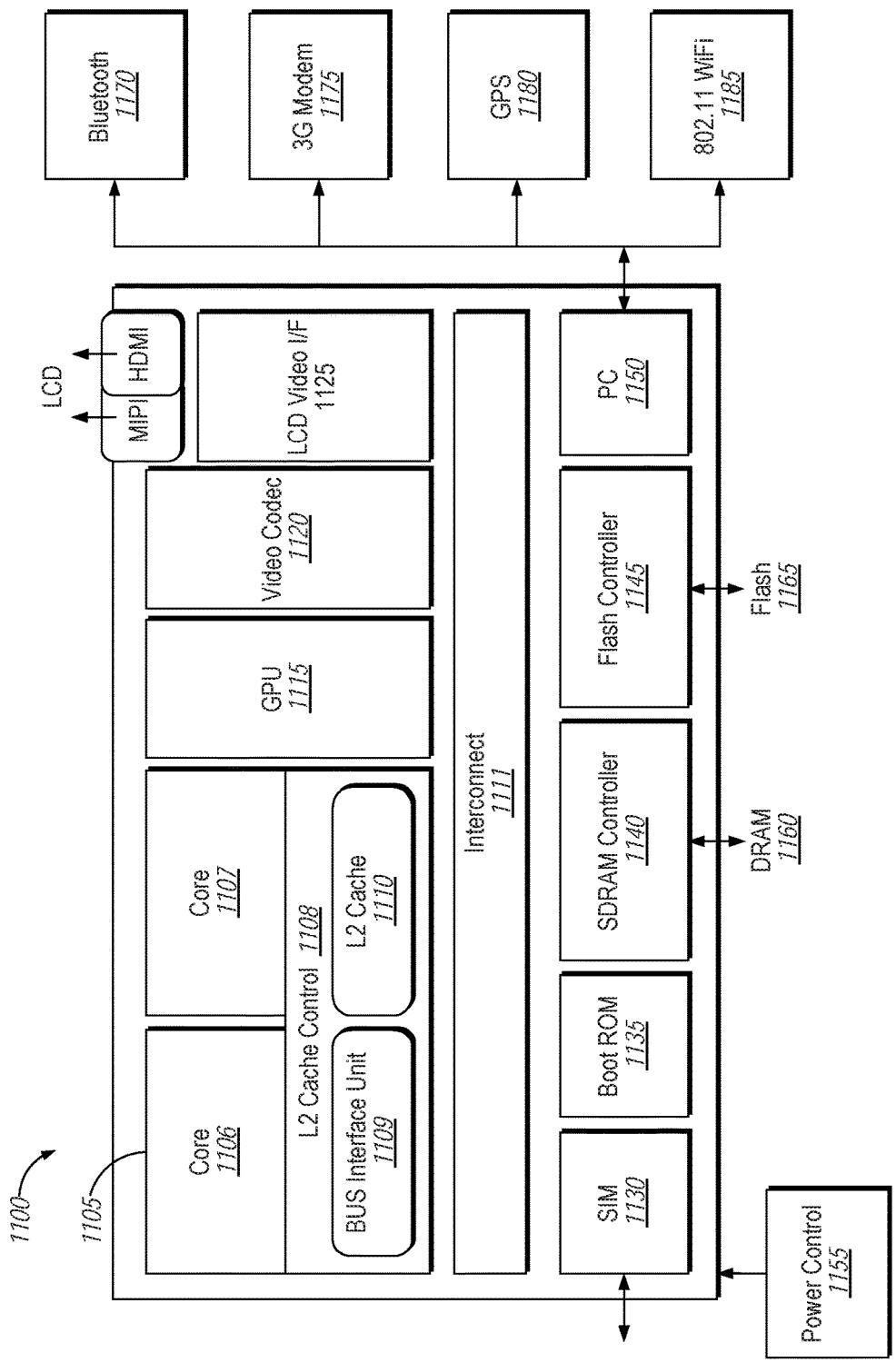
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores-1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
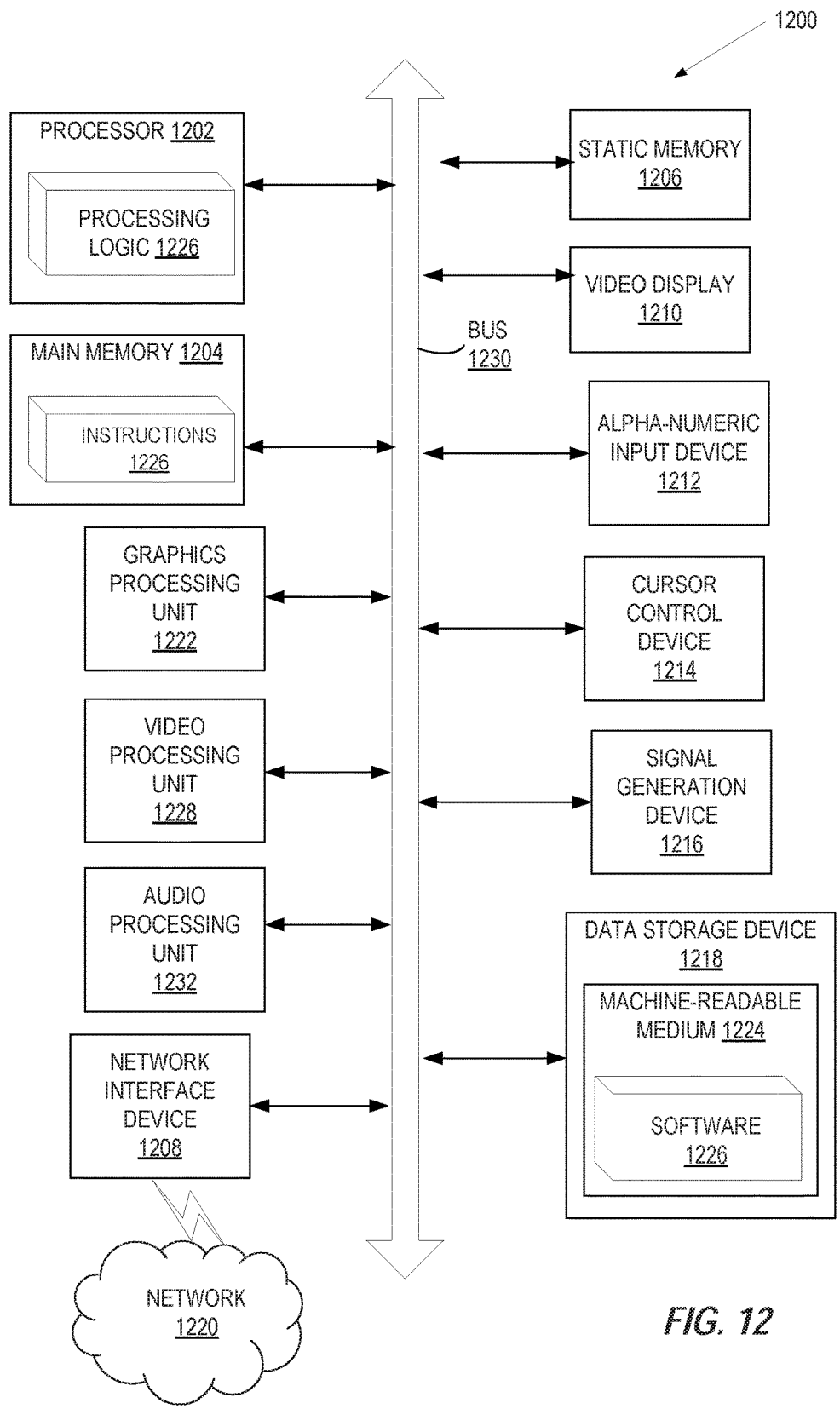
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as processor architecture 100 described with respect to FIG. 1 as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processor comprising a register to store a first pointer to a context data structure specifying a virtual machine context, the context data structure comprising a first field to store a second pointer to a plurality of realm switch control structures (RSCSs), and an execution unit comprising a logic circuit to execute a virtual machine (VM) according to the virtual machine context, wherein the VM comprises a guest operating system (OS) comprising a plurality of kernel components, and wherein each RSCS of the plurality of RSCSs specifies a respective component context associated with a respective kernel component of the plurality of kernel components, and execute a first kernel component of the plurality of kernel components using a first component context specified by a first RSCS of the plurality of RSCSs.

In Example 2, the subject matter of Example 1 can further optionally provide that the context data structure further comprises at least one of a second field to store an extended page table pointer (EPTP), a third field to store content of a control register (CR), a forth field to store content of an instruction pointer (IP) register, or a fifth field to store content of a stack pointer (SP) register.

In Example 3, the subject matter of any of Examples 1 and 2 can optionally provide that each RSCS comprises at least one of a first field to store an identifier associated with the respective kernel component specified by the each RSCS, a second field to store the extended page table pointer (EPTP) associated with the each kernel component, a third field content of the control register (CR) associated with the each kernel component, a forth field to store content of the instruction pointer (IP) register associated with the each kernel component, or a fifth field to store content of the stack pointer (SP) register associated with the each kernel component.

In Example 4, the subject matter of Example 3 can optionally provide that the logic circuit is to execute a virtual machine monitor (VMM), and wherein in response to receiving a VM entry instruction, the VMM is to populate data stored in the context data structure into the EPTP, the control register, the instruction pointer register, and the stack pointer register associated with the processor, and to start the VM according to the VM context specified by the context data structure.

In Example 5, the subject matter of Example 4 can optionally provide that the logic circuit is further to without exiting the VM, switch from the first kernel component to a second kernel component using a second component context specified by a second RSCS of the plurality of RSCSs.

In Example 6, the subject matter of any of Examples 1 and 5 can optionally provide that to execute the first kernel component, the logic circuit is to load data stored in second to fifth fields of the first RSCS correspondingly into second to fifth fields of the context data structure, and execute the first kernel component using the first component context in the context data structure.

In Example 7, the subject matter of Example 6 can optionally provide that the execution unit is to execute the guest OS to store, in a first register, an index value assigned to the second kernel component, store, in a second register, an identifier assigned to the second kernel component, and store, in a third register, a leaf value associated with an instruction implemented in the logic circuit to switch between two kernel components.

In Example 8, the subject matter of Example 7 can optionally provide that the logic circuit is to receive the leaf value associated with the instruction, read the first register to retrieve the index value and determine if the index value is within a range of available RSCSs, in response to determining that the index value is within the range, retrieve the second RSCS from the plurality of RSCSs based on the index value, read the second register to retrieve the identifier associated with the second kernel component, and determine if the identifier matches data stored in the first field of the second RSCS.

In Example 9, the subject matter of Example 8 can optionally provide that the logic circuit if further to in response to determining that the identifier matches the data stored in the first field of the second RSCS, determine if data stored in the second field of the second RSCS is valid, in response to determining that the data stored in the second field of the second RSCS is valid, swap the data stored in the second field of the second RSCS with the data stored in the second field of the context data structure, in response to swapping the data stored in the second field of the second RSCS with the data stored in the second field of the context data structure, determine if the data stored in the third field of the second RSCS is valid, in response to determining the data stored in the third field of the second RSCS is valid, swap the data stored in the third field of the second RSCS with the data stored in the third field of the context data structure, in response to swapping the data stored in the third field of the second RSCS with the data stored in the third field of the context data structure, determine if data stored in the fourth field of the second RSCS is valid, in response to determining the data stored in the fourth field of the second RSCS is valid, swap the data stored in the fourth field of the second RSCS with the data stored in the fourth field of the context data structure, in response to swapping the data stored in the fourth field of the second RSCS with the data stored in the fourth field of the context data structure, determine if data stored in the fifth field of the second RSCS is valid, in response to determining the data stored in the fifth field of the second RSCS is valid, swap the data stored in the fifth field of the second RSCS with the data stored in the fifth field of the context data structure, and execute the second kernel component using the second component context loaded into the context data structure.

In Example 10, the subject matter of Example 6 can optionally provide that the execution unit is further to retrieve, from the second field, an access permission to a host physical space associated with a memory associated with processor, and associate the second component with the access permission to the host physical space.

Example 11 is a system-on-a-chip (SoC) comprising a memory and a processor, operably coupled to the memory, comprising a register to store a first pointer to a context data structure specifying a virtual machine context, the context data structure comprising a first field to store a second pointer to a plurality of realm switch control structures (RSCSs), and an execution unit comprising a logic circuit to execute a virtual machine (VM) according to the virtual machine context, wherein the VM comprises a guest operating system (OS) comprising a plurality of kernel components, and wherein each RSCS of the plurality of RSCSs specifies a respective component context associated with a respective kernel component of the plurality of kernel components, and execute a first kernel component of the plurality of kernel components using a first component context specified by a first RSCS of the plurality of RSCSs.

In Example 12, the subject matter of Example 11 can optionally provide that the context data structure further comprises at least one of a second field to store an extended page table pointer (EPTP), a third field to store content of a control register (CR), a forth field to store content of an instruction pointer (IP) register, or a fifth field to store content of a stack pointer (SP) register.

In Example 13, the subject matter of any of Examples 11 and 12 can optionally provide that each RSCS comprises at least one of a first field to store an identifier associated with the respective kernel component specified by the each RSCS, a second field to store the extended page table pointer (EPTP) associated with the each kernel component, a third field content of the control register (CR) associated with the each kernel component, a forth field to store content of the instruction pointer (IP) register associated with the each kernel component, or a fifth field to store content of the stack pointer (SP) register associated with the each kernel component.

In Example 14, the subject matter of Example 13 can optionally provide that the logic circuit is to execute a virtual machine monitor (VMM), and wherein in response to receiving a VM entry instruction, the VMM is to populate data stored in the context data structure into the EPTP, the control register, the instruction pointer register, and the stack pointer register associated with the processor, and to start the VM according to the VM context specified by the context data structure.

In Example 15, the subject matter of Example 14 can optionally provide that the logic circuit is further to without exiting the VM, switch from the first kernel component to a second kernel component using a second component context specified by a second RSCS of the plurality of RSCSs.

In Example 16, the subject matter of Example 15 can optionally provide that to load data stored in second to fifth fields of the first RSCS correspondingly in second to fifth fields of the context data structure, and execute the first kernel component using the first component context in the context data structure.

In Example 17, the subject matter of Example 16 can optionally provide that the execution unit is to execute the guest OS to store, in a first register, an index value assigned to the second kernel component, store, in a second register, an identifier assigned to the second kernel component, and store, in a third register, a leaf value associated with an instruction implemented in the logic circuit to switch between two kernel components.

In Example 18, the subject matter of Example 17 can optionally provide that the logic circuit is to receive the leaf value associated with the instruction, read the first register to retrieve the index value and determine if the index value is within a range of available RSCSs, in response to determining that the index value is within the range, retrieve the second RSCS from the plurality of RSCSs based on the index value, read the second register to retrieve the identifier associated with the second component, and determine if the identifier matches data stored in the first field of the second RSCS.

In Example 19, the subject matter of Example 18 can optionally provide that in response to determining that the identifier matches the data stored in the first field of the second RSCS, determine if data stored in the second field of the second RSCS is valid, in response to determining that the data stored in the second field of the second RSCS is valid, swap the data stored in the second field of the second RSCS with the data stored in the second field of the context data structure, in response to swapping the data stored in the second field of the second RSCS with the data stored in the second field of the context data structure, determine if the data stored in the third field of the second RSCS is valid, in response to determining the data stored in the third field of the second RSCS is valid, swap the data stored in the third field of the second RSCS with the data stored in the third field of the context data structure, in response to swapping the data stored in the third field of the second RSCS with the data stored in the third field of the context data structure, determine if data stored in the fourth field of the second RSCS is valid, in response to determining the data stored in the fourth field of the second RSCS is valid, swap the data stored in the fourth field of the second RSCS with the data stored in the fourth field of the context data structure, in response to swapping the data stored in the fourth field of the second RSCS with the data stored in the fourth field of the context data structure, determine if data stored in the fifth field of the second RSCS is valid, in response to determining the data stored in the fifth field of the second RSCS is valid, swap the data stored in the fifth field of the second RSCS with the data stored in the fifth field of the context data structure, and execute the second kernel component using the second component context loaded into the context data structure.

Example 20 is a method comprising executing a virtual machine (VM) comprising a guest operating system (OS) comprising a plurality of kernel components, wherein each kernel component is specified by a respective one realm switch control structure (RSCS) of a plurality of RSCSs, wherein the guest operating system runs according to a VM context specified by a context data structure, in response to receiving an indicator to switch to a first kernel component of the guest operating system, selecting a first RSCS from the plurality of RSCSs based on an index value, determining if an identifier associated with the first kernel component matches an identifier stored in a first field of the first RSCS, in response to determining that the identifier associated with the first kernel component matches the identifier stored in the first field of the first RSCS, determining if data stored in a second field of the first RSCS is valid, in response to determining that the data stored in the second field of the first RSCS is valid, swapping the data stored in the second field of the first RSCS with the data stored in a field of the context data structure, and without exiting the VM, executing the first kernel component of the guest operating system using the context data structure.

In Example 21, the subject matter of Example 20 can further include in response to determining that the identifier associated with the first kernel component does not match the identifier stored in the first field of the first RSCS, exiting the VM, and in response to determining that the data stored in the second field of the first RSCS is not valid, exiting the VM.

Example 22 is an apparatus comprising means for performing the method of any of Examples 20 and 21.

Example 23 is a machine-readable non-transitory medium having stored thereon program codes that, when executed, perform operations comprising executing a virtual machine (VM) comprising a guest operating system (OS) comprising a plurality of kernel components, wherein each kernel component is specified by a respective one realm switch control structure (RSCS) of a plurality of RSCSs, wherein the guest operating system runs according to a VM context specified by a context data structure, in response to receiving an indicator to switch to a first kernel component of the guest operating system, selecting a first RSCS from the plurality of RSCSs based on an index value, determining if an identifier associated with the first kernel component matches an identifier stored in a first field of the first RSCS, in response to determining that the identifier associated with the first kernel component matches the identifier stored in the first field of the first RSCS, determining if data stored in a second field of the first RSCS is valid, in response to determining that the data stored in the second field of the first RSCS is valid, swapping the data stored in the second field of the first RSCS with the data stored in a field of the context data structure, and without exiting the VM, executing the first kernel component of the guest operating system using the context data structure.

In Example 23, the subject matter of Example 22 can further include in response to determining that the identifier associated with the first kernel component does not match the identifier stored in the first field of the first RSCS, exiting the VM, and in response to determining that the data stored in the second field of the first RSCS is not valid, exiting the VM.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
a register to store a first pointer to a context data structure specifying a virtual machine context comprising a first kernel component context; and
an execution circuit to:
execute a virtual machine (VM) according to the virtual machine context, wherein the VM comprises a guest operating system (OS) comprising a first kernel component specified according to the first kernel component context; and
execute the first kernel component using the first kernel component context.

2. The processor of claim 1, wherein the context data structure further comprises a first field to store a pointer to a plurality of real switch control structures (RSCSs) and at least one of a second field to store an extended page table pointer (EPTP), a third field to store content of a control register (CR), a fourth field to store content of an instruction pointer (IP) register, or a fifth field to store content of a stack pointer (SP) register.

3. The processor of claim 2, wherein each of the plurality of RSCSs comprises at least one of a first field to store an identifier associated with the respective kernel component of a plurality of kernel components specified by each of the plurality of RSCSs, a second field to store the extended page table pointer (EPTP) associated with each of the plurality of kernel components, a third field content of the control register (CR) associated with each of the plurality of kernel components, a fourth field to store content of the instruction pointer (IP) register associated with each of the plurality of kernel components, or a fifth field to store content of the stack pointer (SP) register associated with each of the plurality of kernel components.

4. The processor of claim 3, wherein the execution circuit is to execute a virtual machine monitor (VMM), and wherein in response to receiving a VM entry instruction, the VMM is to populate data stored in the context data structure into the EPTP, the control register, the IP register, and the SP register associated with the processor, and to start the VM according to the VM context specified by the context data structure.

5. The processor of claim 1, wherein the execution circuit is further to,
without exiting the VM, switch from the first kernel component to a second kernel component using a second kernel component context specified by a second RSCS of the plurality of RSCSs.

6. The processor of claim 5, wherein to execute the first kernel component, the execution circuit is to:
load data stored in second to fifth fields of a first RSCS correspondingly into second to fifth fields of the context data structure; and
execute the first kernel component using the first kernel component context in the context data structure.

7. The processor of claim 6, wherein the execution circuit is to execute the guest OS to:
store, in a first register, an index value assigned to the second kernel component;
store, in a second register, an identifier assigned to the second kernel component; and
store, in a third register, a leaf value associated with an instruction executed by the executing circuit to switch between two kernel components.

8. The processor of claim 7, wherein the execution circuit is to:
receive the leaf value associated with the instruction;
read the first register to retrieve the index value and determine if the index value is within a range of available RSCSs;
in response to determining that the index value is within the range, retrieve the second RSCS from the plurality of RSCSs based on the index value;
read the second register to retrieve the identifier associated with the second kernel component; and
determine if the identifier matches data stored in a first field of a second RSCS.

9. The processor of claim 8, wherein the execution circuit is further to:

in response to determining that the identifier matches the data stored in the first field of the second RSCS, determine if data stored in the second field of the second RSCS is valid;

in response to determining that the data stored in the second field of the second RSCS is valid, swap the data stored in the second field of the second RSCS with the data stored in the second field of the context data structure;

in response to swapping the data stored in the second field of the second RSCS with the data stored in the second field of the context data structure, determine if the data stored in the third field of the second RSCS is valid;

in response to determining the data stored in the third field of the second RSCS is valid, swap the data stored in the third field of the second RSCS with the data stored in the third field of the context data structure;

in response to swapping the data stored in the third field of the second RSCS with the data stored in the third field of the context data structure, determine if data stored in the fourth field of the second RSCS is valid;

in response to determining the data stored in the fourth field of the second RSCS is valid, swap the data stored in the fourth field of the second RSCS with the data stored in the fourth field of the context data structure;

in response to swapping the data stored in the fourth field of the second RSCS with the data stored in the fourth field of the context data structure, determine if data stored in the fifth field of the second RSCS is valid;

in response to determining the data stored in the fifth field of the second RSCS is valid, swap the data stored in the fifth field of the second RSCS with the data stored in the fifth field of the context data structure; and execute the second kernel component using the second kernel component context loaded into the context data structure.

10. The processor of claim 6, wherein the execution circuit is further to:

retrieve, from the second field, an access permission to a host physical space associated with a memory associated with processor; and associate the second kernel component with the access permission to the host physical space.

11. A system-on-a-chip (SoC) comprising:

a memory; and a processor, operably coupled to the memory, comprising:

a register to store a first pointer to a context data structure specifying a virtual machine context comprising a first kernel component context; and an execution circuit to:

execute a virtual machine (VM) according to the virtual machine context, wherein the VM comprises a guest operating system (OS) comprising a first kernel component specified according to the first kernel component context; and execute the first kernel component using the first kernel component context.

12. The SoC of claim 11, wherein the context data structure further comprises a first field to store a pointer to a plurality of real switch control structures (RSCSs), and at least one of a second field to store an extended page table pointer (EPTP), a third field to store content of a control register (CR), a forth field to store content of an instruction pointer (IP) register, or a fifth field to store content of a stack pointer (SP) register.

13. The SoC of claim 12, wherein each of the plurality of RSCS comprises at least one of a first field to store an identifier associated with the respective kernel component of a plurality of kernel components specified by the each of the plurality of RSCSs, a second field to store the extended page table pointer (EPTP) associated with each of the plurality of kernel components, a third field content of the control register (CR) associated with each of the plurality of kernel components, a forth field to store content of the instruction pointer (IP) register associated with the each of the plurality of kernel components, or a fifth field to store content of the stack pointer (SP) register associated with the each of the plurality of kernel components.

14. The SoC of claim 13, wherein the execution circuit is to execute a virtual machine monitor (VMM), and wherein in response to receiving a VM entry instruction, the VMM is to populate data stored in the context data structure into the EPTP, the control register, the IP register, and the SP register associated with the processor, and to start the VM according to the VM context specified by the context data structure.

15. The SoC of claim 14, wherein the execution circuit is further to, without exiting the VM, switch from the first kernel component to a second kernel component using a second kernel component context specified by a second RSCS of the plurality of RSCSs.

16. The SoC of claim 15, wherein to execute the first kernel component, the execution circuit is to:

load data stored in second to fifth fields of the first RSCS correspondingly in second to fifth fields of the context data structure; and execute the first kernel component using the first kernel component context in the context data structure.

17. The SoC of claim 16, wherein the execution circuit is to execute the guest OS to:

store, in a first register, an index value assigned to the second kernel component;

store, in a second register, an identifier assigned to the second kernel component; and store, in a third register, a leaf value associated with an instruction executed by the execution circuit to switch between two kernel components.

18. The SoC of claim 17, wherein the execution circuit is to:

receive the leaf value associated with the instruction;

read the first register to retrieve the index value and determine if the index value is within a range of available RSCSs;

in response to determining that the index value is within the range, retrieve the second RSCS from the plurality of RSCSs based on the index value;

read the second register to retrieve the identifier associated with the second kernel component; and determine if the identifier matches data stored in the first field of the second RSCS.

19. A method comprising:

executing a virtual machine (VM) comprising a guest operating system comprising a first kernel component specified accordingly to a first kernel component context, wherein the guest operating system runs according to a VM context specified by a context data structure;

receiving an indicator to switch to the first kernel component of the guest operating system;

determining that an identifier associated with the first kernel component matches an identifier stored in a first field of a first RSCS;

determining that data stored in a second field of the first RSCS is valid;

swapping the data stored in the second field of the first RSCS with the data stored in a field of the context data structure; and without exiting the VM, executing the first kernel component of the guest operating system using the first kernel component context.

20. The method of claim 19, further comprising:

in response to determining that the identifier associated with the first kernel component does not match the identifier stored in the first field of the first RSCS, exiting the VM; and in response to determining that the data stored in the second field of the first RSCS is not valid, exiting the VM.

\* \* \* \* \*